May 17, 1960 L. PÉRAS 2,936,860
HERMETICALLY SEALED DAMPING DEVICE
Filed Nov. 17, 1958 2 Sheets-Sheet 1

INVENTOR
LUCIEN Peras

By Stevens, Davis, Miller & Mosher
ATTORNEYS

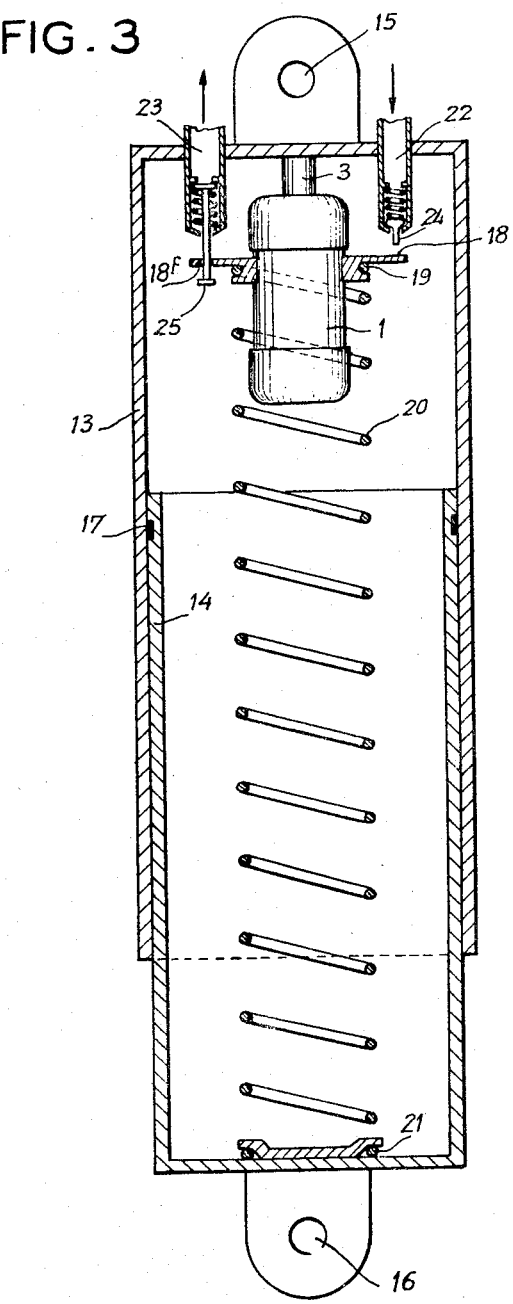

United States Patent Office 2,936,860
Patented May 17, 1960

2,936,860

HERMETICALLY SEALED DAMPING DEVICE

Lucien Péras, Billancourt, France, assignor to Regie Nationale des Usines Renault, Billancourt, France Application November 17, 1958, Serial No. 774,338

Claims priority, application France December 6, 1957

1 Claim. (Cl. 188—94)

This invention relates in general to damping devices and has particular reference to improvements in or relating to fluid-filled shock-absorbing devices of the type generally called "dash-pots," adapted to provide a braking or retarding force increasing with the relative velocity of movement between the piston element and the cylinder element, this force being as near as possible to zero when this relative speed is null. It is one object of this invention to provide a damping device of this general character which is highly sensitive in that the braking effort is substantially null at zero relative speed, without impairing a complete tightness of the device against fluid leakages.

This invention is suitable for the great majority of known and conventional applications of dash-pot type damping devices. It is particularly advantageous when applied to intermediate-position indicators constituting the main component element of levelling means of the type used in suspension systems of automotive vehicles for maintaining the suspended or sprung mass of the vehicle to a constant level or height independently of the load carried by the vehicle. A typical example of this application will be described presently.

Thus, when dash-pot damping devices are mounted for operation in a fluid medium to be separated or isolated from the fluid filling the dash-pots, they are usually characterized by the drawback of exerting a relatively important braking action even at zero relative speed, due either to the use of rotary or sliding packings or seals directly responsive to the working pressure of the fluid, or to the fact that their operation is attended by the deformation of diaphragms, the stiffness of which is sufficient to resist the working pressure of the fluid.

Now, this invention provides means for avoiding this drawback, its chief feature lying in the fact that it is so designed that the members provided for sealing the device from the external medium are subjected to a pressure constantly lower than the operating pressure of the fluid contained therein.

In order to afford a clear understanding of this invention and of the manner in which the same may be carried out in the practice, reference will now be made to the attached drawings forming part of this specification and illustrating diagrammatically by way of example a few typical forms of embodiment of the invention. In the drawings:

Figure 3 is an axial section showing a practical application of the device of this invention when used as means for detecting the average position and therefore permit the correction of the level in a pneumatic suspension element of a vehicle.

Figure 1:
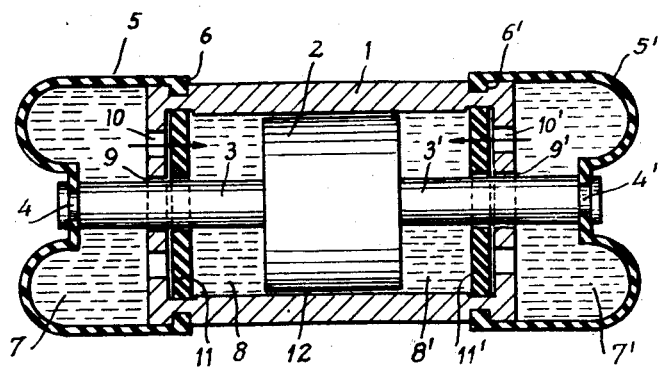
Figure 1 is an axial section showing a damping device constructed according to the teachings of this invention.

The dash-pot illustrated in Fig. 1 consists of a cylinder 1 in which a piston 2 is mounted for free sliding movement, the opposite rods 3, 3¹ of this piston extending through the bottoms or end walls of the cylinder and having their outer ends secured to the central region of a pair of fluid-proof flexible covers or diaphragms 5, 5¹. These covers or diaphragms 5, 5¹ are also secured at 6, 6' on the outer ends of the cylinder 1, both connections 4, 4' and 6, 6' being fluid-tight. The chambers 7, 7' formed between the inner walls of the flexible diaphragms and the outer faces of the cylinder bottoms or end walls, as well as the chambers 8, 8' on either side of the piston 2, are filled with a suitable damping fluid. The chambers 7 and 8 formed on a same side of the piston 2 communicate with each other through one or more orifices or like small-sectioned passages so that the damping fluid, when flowing through these orifices or passages from chamber 7 to chamber 8 and vice-versa, undergoes a substantial pressure drop. In this example, the passages consist of the annular clearances 9, 9' left between the rods 3, 3' and the corresponding end walls or bottoms of the cylinder. Moreover, these chambers 7, 8 are interconnected by other orifices causing pressure drops considerably lower than those obtaining through the clearances 9, 9' but in this case the fluid circulates only in the direction of the arrows.

In this example, this unidirectional fluid circulation is obtained by providing a series of holes 10, 10' forming together a relatively considerable total cross-sectional area, these holes being checked by valve members 11, 11' opening in the direction of the arrows immediately as the pressure in chamber 7 exceeds the pressure built up in chamber 8. Obviously, if a pressure differential occurs in the opposite direction the valve members 11 or 11' will be seated on the holes 10 (or 10') to prevent the passage of fluid from chamber 8 (or 8') to chamber 7 (or 7').

Figure 2:
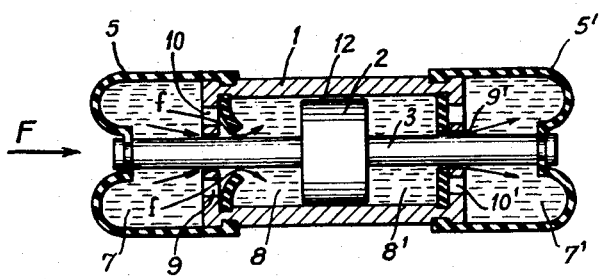
Figure 2 is a similar view of the same device to illustrate its mode of operation.

This arrangement of the chambers, orifices and valves of the device constitutes a characteristic feature of this invention which will be evidenced in the following description of the operation of the device, which is given with reference to Fig. 2.

When the dash-pot piston 2 is urged for example in the direction of the arrow F, the chamber 8' is pressurized and the fluid contained therein is forced through the passage 9' into the adjacent chamber 7' and to a minor extent into the other chamber 8 on account of possible leakages around the piston at 12. Due to the loss of pressure resulting from the passage of fluid across 9' and 12, the pressures present in chambers 7' and 7 are considerably lower than those built up in chamber 8' by the thrust F and may even be very low, depending on the design of the diaphragms 5, 5¹.

On the other hand, the pressure in chamber 7 is only very moderately higher than that obtaining in chamber 8 since the liquid filling it is urged in the direction of the arrows f and flows mainly through the holes 10 which, by construction, create only moderate losses of pressure for the practical range of piston speeds.

As a rule, the pressures in the two flexible cases 5, 5' are thus quite inferior to the working pressure of the dash-pot, that is, the pressure in chamber 8' during this movement. The end covers or diaphragm may therefore be designed accordingly so as to have a great flexibility and this feature combined with the arrangement of the chambers and fluid passages in the device impart to the latter the desired high sensibility.

Of course, it would not constitute a departure from the principles of this invention if elements of a different character, of the type comprising or co-acting with sliding packings or seals, for example, were substituted for the flexible diaphragms 5, 5' and if the valves described were replaced by devices having the same function, In this example, the suspension system element (Fig. 3) consists of a pair of cylinders 13, 14 mounted and assembled for relative axial sliding movement in each other, and filled with a gas under pressure. Each cylinder is secured by means of a suitable lug 15, 16 to the body and to the unsprung mass of the vehicle, one of these suspension system elements being associated with each wheel.

A sliding seal 17 is provided between the two cylinders 13, 14.

The dash-pot described hereinabove is secured by its piston rod 3 to the upper portion of cylinder 13.

The dash-pot body 1 is surrounded by and solid with an annular member 18 having attached to a suitable groove thereof one end 19 of a tension spring 20 having its opposite end 21 secured to the bottom of cylinder 14, as shown.

Valves 22, 23 are fitted in the top or end wall of the upper cylinder 13 for introducing gas under pressure into, and releasing gas from, the inner space of cylinders 13, 14, respectively.

The free or unstressed length of spring 20 is equal to the distance from the reference face 18f of member 18 to the bottom of cylinder 14 on the one hand when this annular member is in its intermediate position between the ends 24 and 25 of the control shanks of valves 22 and 23 and on the other hand when the cylinders 13 and 14 are in their reference relative or intermediate position (corresponding to the average position of the sprung mass relative to the unsprung mass of the vehicle).

Thus, when the suspension system is in its average position the spring 20 is inoperative regarding the level-indicating dash-pot if the annular member 18 is positioned half-way between the shanks of valves 22 and 23.

If the suspension system oscillates symmetrically on either side of its average position the end 19 of the spring will act through the annular member 18 upon the dash-pot so as to alternately push and pull the latter at the same frequency and according to the same law.

In the case of relatively high frequencies (i.e. from one cycle per second up), the dash-pot oscillation remains relatively very moderate by design, and the valves 24 and 25 are not engaged by the annular member 18, the spring 20 being subjected to the oscillation of the suspension system.

In the case of considerably lower frequency values the dash-pot, due to the sensitiveness and to the action of spring 20, follows the displacements of the cylinder 14 relative to cylinder 13. Finally, if the load carried by the vehicle is altered, for example increased, the pneumatic element of the suspension system will tend to become shorter and to assume a different average position. The now compressed spring 20 will lift the dash-pot and the annular member 18 will finally open the valve 22. Thus, gas under pressure is fed to the suspension element through this valve until the annular member 18 is moved downwards and releases the inlet valve 22. This condition is obtained when the dash-pot is restored to its average position by the spring 20 acting as a traction member.

With a highly sensitive dash-pot only a very moderate traction exerted by this spring is sufficient for discontinuing the supply of gas under pressure, this supply being stopped when the cylinders resume a position very close to their reference average position, whereafter the correction is completed.

If the load transported by the vehicle is reduced, the correcting device will operate in a similar way but in this case it is the exhaust valve 23 that will be opened momentarily.

Of course, an average-position detector of this character may also be associated with different suspension elements, for example of the deformable or bellows type, without departing from the spirit and scope of the invention. Again, many modifications as to the proportions, dimensions, and relative proportions of the parts constituting the dash-pot may be altered without departing from the basic principles of the invention as set forth in the appended claim.

I claim:

Fluid-containing damping device characterized in that it comprises a cylinder with closed ends, in which a slidably mounted piston provided with a pair of opposite rods forms therein two opposite chambers, each chamber communicating with an adjacent space forming an extension of the chamber, said space being bound by flexible members fixed to the piston rods and cylinder ends and being scaled to the cylinder ends, said chambers and spaces being filled with a damping liquid and passages provided between each chamber and the adjacent space being gauged and adapted to create predetermined losses of pressure therebetween during fluid flow therethrough, said passages including larger passages controlled by check valve means and adapted to create only very moderate losses of pressure in the space-to-chamber direction, whereby a considerable sensitiveness is imparted to the device wherein, said flexible members for sealing the device from the external medium are subjected only to a pressure considerably lower than the working pressure built up in the chambers of the device.

References Cited in the file of this patent

UNITED STATES PATENTS

| | | |
|---|---|---|
| 1,641,640 | Myers | Sept. 6, 1927 |
| 1,936,788 | Hardy | Nov. 28, 1933 |
| 2,361,575 | Thompson | Oct. 31, 1944 |
| 2,719,611 | Carbon | Oct. 4, 1955 |
| 2,815,829 | Boehm et al. | Dec. 10, 1957 |

FOREIGN PATENTS

| | | |
|---|---|---|
| 475,877 | Germany | May 11, 1927 |